(12) United States Patent
Ghoneim

(10) Patent No.: US 9,828,965 B2
(45) Date of Patent: Nov. 28, 2017

(54) METHOD AND APPARATUS TO EVALUATE A STARTER MOTOR FOR AN INTERNAL COMBUSTION ENGINE

(71) Applicant: GM GLOBAL TECHNOLOGY OPERATIONS LLC, Detroit, MI (US)

(72) Inventor: Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 15/002,821

(22) Filed: Jan. 21, 2016

(65) Prior Publication Data

US 2017/0211536 A1     Jul. 27, 2017

(51) Int. Cl.
| | |
|---|---|
| F02N 11/10 | (2006.01) |
| F02N 11/08 | (2006.01) |
| B60K 6/387 | (2007.10) |
| B60W 20/00 | (2016.01) |
| B60W 10/04 | (2006.01) |
| B60K 6/48 | (2007.10) |

(52) U.S. Cl.
CPC ........ *F02N 11/108* (2013.01); *F02N 11/0862* (2013.01); *B60K 6/387* (2013.01); *B60K 6/48* (2013.01); *B60W 10/04* (2013.01); *B60W 20/00* (2013.01); *F02N 2300/304* (2013.01)

(58) Field of Classification Search
CPC .. B61C 17/12; B60K 6/46; B60K 6/48; B60K 6/387; B60K 6/00; B60K 6/04; B60W 20/00; B60W 10/04; F02D 41/04; F02D 41/0002; F02D 41/042; G01N 33/26; G01N 33/28; G01N 33/2876; F02N 11/08; F02N 11/108; F02N 11/0862; H02J 7/1423; B60L 3/0046
See application file for complete search history.

(56) References Cited

U.S. PATENT DOCUMENTS

| | | | |
|---|---|---|---|
| 6,612,386 B2 * | 9/2003 | Tamai | B60K 6/48 180/65.25 |
| 6,920,779 B2 * | 7/2005 | Carlstrom | G01N 33/2876 340/457.4 |
| 7,212,910 B2 * | 5/2007 | Akasaka | F02D 41/0002 701/112 |
| 7,743,649 B1 | 6/2010 | Salman et al. | |
| 8,055,460 B2 | 11/2011 | Rajagopalan et al. | |

(Continued)

*Primary Examiner* — Behrang Badii
(74) *Attorney, Agent, or Firm* — Quinn IP Law

(57) ABSTRACT

A method for monitoring an engine starting system includes detecting a first engine crank command, monitoring engine speed states, and collecting the engine speed states in a first buffer disposed in a first controller. A second engine crank command is determined based upon monitored electric power states from a battery. The electric power states from the battery are collected in a second buffer disposed in a second controller. The engine speed states collected in the first buffer are synchronized with the electric power states from the battery collected in the second buffer based upon the first engine crank command and the second engine crank command. A starter resistance is determined based upon the electric power states from the battery. A telematics device communicates the starter resistance and the monitored engine speed states synchronized with the monitored electric power states to a remote system.

1 Claim, 3 Drawing Sheets

(56) References Cited

U.S. PATENT DOCUMENTS

| | | |
|---|---|---|
| 8,234,036 B2 | 7/2012 | Shin |
| 9,199,651 B2 * | 12/2015 | Wada ........................ B60K 6/46 |
| 2004/0204816 A1 * | 10/2004 | Dery .................... B60R 25/045 |
| | | 701/113 |
| 2011/0017533 A1 * | 1/2011 | Bissontz ................ B60K 6/387 |
| | | 180/65.25 |
| 2013/0046435 A1 | 2/2013 | Shin |

* cited by examiner

METHOD AND APPARATUS TO EVALUATE A STARTER MOTOR FOR AN INTERNAL COMBUSTION ENGINE

TECHNICAL FIELD

This disclosure is related to starting systems for internal combustion engines.

BACKGROUND

Electrical systems for mobile platforms include electric machines, e.g., motors and accessory drive devices that receive electric power from energy storage devices and are controlled by signals originating from control modules and other control devices and logic circuits. One electric circuit is a starting system that includes an electric-powered starter motor that spins an internal combustion engine when activated with an ignition switch. A fault in a starting system may result in an engine non-start event.

SUMMARY

An internal combustion engine disposed on a mobile platform and including a starting system and a telematics device is described. The starting system includes a starter motor electrically connectable to a battery. A method for monitoring the starting system includes detecting a first engine crank command, monitoring engine speed states, and collecting the engine speed states in a first buffer disposed in a first controller. Electrical power states from the battery are monitored, and a second engine crank command is determined based upon the electric power states from the battery. The electric power states from the battery are collected in a second buffer disposed in a second controller, wherein the monitored electric power states include current and voltage. The engine speed states collected in the first buffer are synchronized with the electric power states from the battery collected in the second buffer based upon the first engine crank command and the second engine crank command. A starter resistance is determined based upon the electric power states from the battery collected in the second buffer. A telematics device communicates the starter resistance and the monitored engine speed states synchronized with the monitored electric power states to a remote system.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
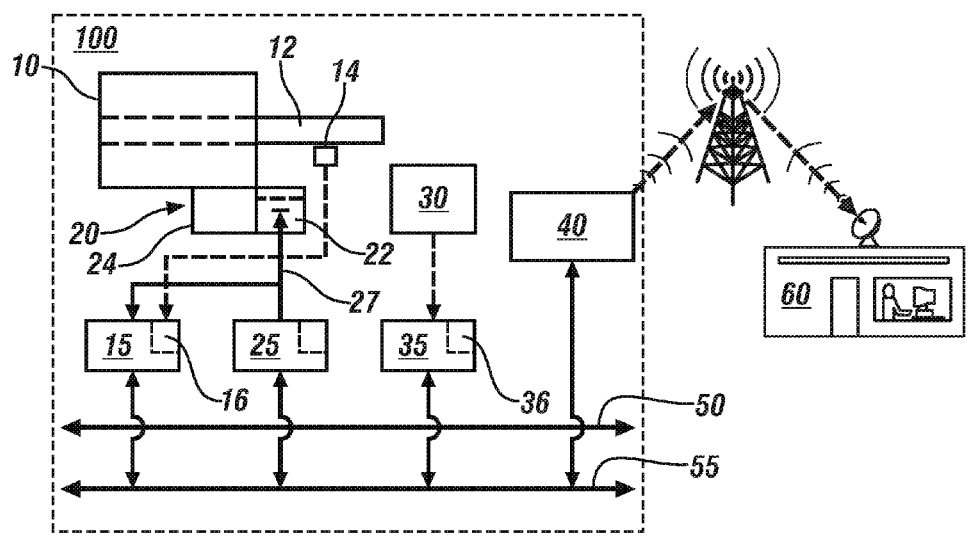
FIG. 1 schematically shows an internal combustion engine disposed on a vehicle and including a starting system and a telematics device, in accordance with the disclosure.

Referring now to the drawings, wherein the showings are for the purpose of illustrating certain exemplary embodiments only and not for the purpose of limiting the same, FIG. 1 schematically shows an internal combustion engine (engine) 10 disposed on a mobile platform in the form of a vehicle 100 and including a starting system 20 and a telematics device 40. The vehicle 100 may include any mobile platform, including by way of non-limiting examples, a passenger vehicle, a light-duty or heavy-duty truck, a utility vehicle, an agricultural vehicle, an industrial/warehouse vehicle, a recreational off-road vehicle, a robotic device, or an aeronautic device. The starting system 20 of the engine 10 is electrically couplable to an electric energy storage device (battery) 30.

A plurality of controllers are preferably configured to monitor and/or control operation of the engine 10, the starter 20 and the battery 30. By way of non-limiting example, an engine controller 15 is operatively connected to the engine 10, a battery controller 35 is operatively connected to the battery 30, and a body controller 25 is operatively connected to the starter 20. The engine controller 15 includes a first data cache or buffer 16, and the battery controller 35 includes a second data cache or buffer 36.

Communication between controllers, and communication between controllers, actuators and/or sensors may be accomplished using a direct wired point-to-point link, a networked communication bus link, a wireless link or another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers.

The engine, body and battery controllers 15, 25, 35 and the telematics device 40 are able to communicate messages, including direct communication via point-to-point signal communication lines and structured communication via first and second communication buses 50, 55, respectively. As shown, the engine controller 15, body controller 25, and telematics device 40 communicate via the second communication bus 55, the battery controller 25 communicates via the first communication bus 50, and the first and second communications buses 50, 55 share messages in accordance with a structured protocol. Each of the first and second communication buses 50, 55 provides a communication link, preferably in the form of a hard-wired twisted pair of electrical cables, through which the first, second and third controllers 15, 25, 35 and the telematics device 40 communicate. The first, second and third controllers 15, 25, 35 and the telematics device 40 preferably include interface devices that electrically connect to one of the first and second communication buses 50, 55. The interface devices execute structured protocols to facilitate communication, preferably in the form of serial communications. Communication buses and structured protocols for communication are known, and thus not described herein.

The engine 10 may include any suitable internal combustion engine employing an embodiment of the starting system 20 that is configured to execute engine starting events. In certain embodiments, the engine 10 is configured to execute autostop/autostart operations and related engine stop/start functions during ongoing vehicle operation. The engine 10 is equipped with a plurality of actuators and sensing devices for monitoring operation and delivering fuel to form a combustion charge to produce torque that is responsive to an operator torque request. In one embodiment, the engine 10 is a spark-ignition engine configured to operate as a spark-ignition combustion mode with combustion controlled by a spark ignition system, and may include operation in a homogeneous charge spark-ignition combustion mode. Alternatively, the engine 10 may be a compression-ignition engine configured to operate in a compression-ignition combustion mode with combustion controlled by timing of injected fuel. Engine actuators preferably include fuel injectors, air flow controllers, spark-ignition systems on engines so equipped, and other devices associated with controlling engine operation to control the aforementioned engine states. Engine sensing devices preferably include a crankshaft position sensor 14 configured to monitor rotational speed states of a crankshaft 12 of the engine 10.

The starting system 20 of the engine 10 preferably includes a starter motor 24 and a starter switch 22, wherein the starter motor 24 is electrically couplable to the battery 30 when the starter switch 22 is activated. The starter switch 22 electrically couples the starter motor 24 to the battery 30 in response to a crank command originating from the body controller 25 that is communicated to the starter switch 22 and the engine controller 15 via control line 27. The crank command may result from a key-on, crank and run command initiated by a vehicle operator. In certain embodiments, the engine crank command may be initiated by the body controller 25 as an autostart operation during vehicle operation that is a part of engine stop/start operation during vehicle operation. This includes executing engine crank and autostarting operations in response to a command from the body controller 25 without a key-on start command from a vehicle operator.

The starter motor 24 may include any suitable engine cranking device, and may be a permanent-magnet DC electric motor with an attached starter solenoid in one embodiment. In such embodiment, a rotatable shaft of the starter motor 24 includes a moveable drive pinion gear that is configured to meshingly engage a starter ring gear attached to a crankshaft of the engine 10 when the starter solenoid is activated during a starting event. When the starter switch 22 is activated, electric current is supplied to the starter solenoid to cause the moveable drive pinion gear to meshingly engage the starter ring gear attached to the crankshaft of the engine 10 and supply electric current to spin the starter motor 24, thus cranking the engine 10. In one embodiment, the starter motor 24 is configured to begin cranking the engine 10 while the engine 10 is spinning in an unfueled state. Such a configuration may include a starter employing two solenoid devices, including a first solenoid to spin the starter motor and a second solenoid to activate a moveable drive pinion gear to meshingly engage the starter ring gear coupled to the engine crankshaft. Such a configuration permits an engine starting sequence that includes spinning the starter motor 24 to synchronize speed states with the engine 10 and activating the moveable drive pinion gear when the speed states are synchronized.

The battery 30 may be any suitable electrical energy storage device, and in one embodiment is a multi-celled low-voltage lead-acid battery, e.g., a 12V battery. The battery controller 35 is configured to monitor operating parameters of the battery 30, including battery temperature, battery voltage and battery current. The battery operating parameters can be directly monitored, estimated, or otherwise determined during ongoing system operation.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality, including one of the first and second buffers 16, 36 described herein. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 10 milliseconds during ongoing operation. Alternatively, routines may be executed in response to occurrence of a triggering event.

Figure 2:
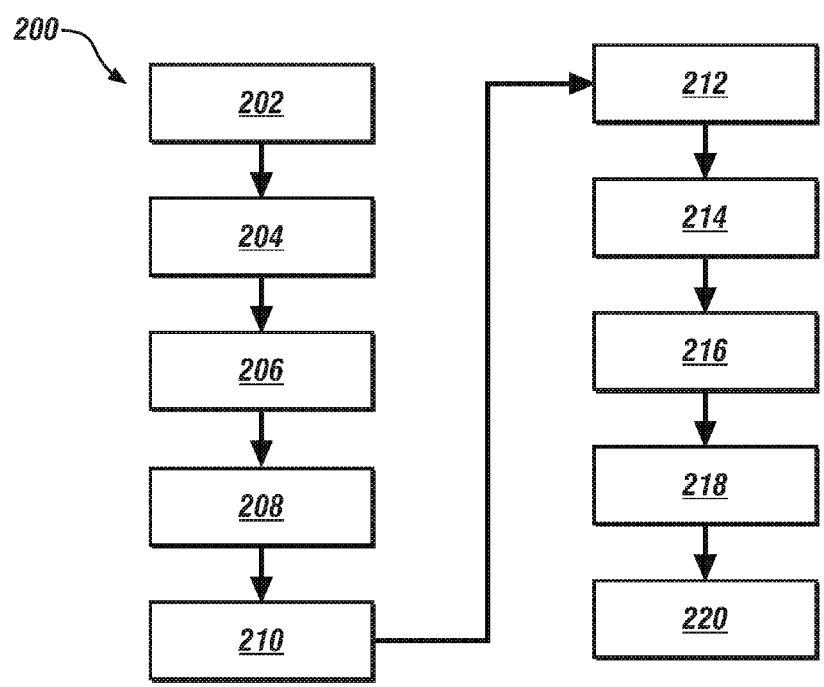
FIG. 2 schematically shows a remote starter monitoring routine that includes monitoring a starting system for an internal combustion engine of a vehicle, in accordance with the disclosure.

FIG. 2 schematically shows a remote starter monitoring routine (routine) 200 that includes monitoring a starting system for an internal combustion engine of a vehicle, wherein the starting system includes a starter motor electrically connectable to a battery, and wherein the vehicle includes a telematics or other communication system disposed to communicate with an off-vehicle system. One embodiment is described hereinabove with reference to FIG. 1. Table 1 is provided as a key wherein the numerically labeled blocks and the corresponding functions are set forth as follows, corresponding to the routine 200.

TABLE 1

| BLOCK | BLOCK CONTENTS |
|---|---|
| 202 | Monitor engine speed states and electric power states from the battery |
| 204 | Detect a first engine crank command |
| 206 | Collect engine speed states ($\omega$) in a first buffer when the first engine crank command is detected |
| 208 | Estimate a second engine crank command based upon battery current |
| 210 | Collect electric power states (i, v) in a second buffer when the second engine crank command is detected |
| 212 | Synchronize the engine speed states in the first buffer and the electric power states in the second buffer |
| 214 | Determine a starter resistance based upon the electric power states in the second buffer |
| 216 | Communicate the engine speed states in the first buffer, the synchronized electric power states in the second buffer and the starter |

TABLE 1-continued

| BLOCK | BLOCK CONTENTS |
|---|---|
| | resistance to an off-board system |
| 218 | Evaluate the starter based upon the engine speed states in the first buffer synchronized with the electric power states in the second buffer and the starter resistance to an off-vehicle system at the off-board system |
| 220 | Determine a state of health of the starter at the off-vehicle system |

The routine 200 provides a method and system to collect data from different controllers, e.g., the first, second and third controllers 15, 25 and 35 of the vehicle 100 of FIG. 1. Operation of the routine 200 includes monitoring states of various on-vehicle parameters, including, e.g., the engine rotational speed states and the battery electric power states (202). The battery electric power is associated with battery power that is available to operate the starter 20. Preferably, the routine 200 initiates execution when the engine 10 is in an OFF state, i.e., not rotating. The engine 10 may be in the OFF state in conjunction with a vehicle key-off state or in conjunction with previous execution of an engine autostop routine during vehicle operation. As such, the engine speed state may initially be at or near zero RPM.

A first engine crank command may be in the form of a point-to-point communication from the body controller 25 to the engine controller 15 via control line 27.

Upon detecting occurrence of the first engine crank command (204), e.g., via a point-to-point communication from the body controller 25, the engine controller 15 commands the first buffer 16 to periodically collect engine speed states, e.g., at a rate of one datapoint each 10 milliseconds (206). The first engine crank signal is preferably associated with the contents of the first buffer 16 at during the engine start. The contents of the first buffer 16, which may be in the form of the engine speed states after the first engine crank command, are communicated on the second bus 55, and may be indicated as a one-dimensional array, as follows:

$$\begin{bmatrix} \omega_1 \\ \omega_2 \\ \omega_3 \\ \vdots \\ \omega_j \\ \vdots \\ \omega_{p-1} \\ \omega_p \\ \vdots \\ \omega_n \end{bmatrix}$$

The one-dimensional array may have a quantity of n values, wherein $\omega_1$ indicates a first engine speed state in the first buffer 16 having a value of 0 RPM, and is associated with the first engine crank command. The engine speed state $\omega_{p-1}$ indicates a final engine speed state in the first buffer 16 that has a value of 0 RPM, $\omega_p$ indicates a first engine speed state in the first buffer 16 having a non-zero value, and $\omega_n$ indicates a final engine speed state in the first buffer 16.

The routine 200 also estimates a second engine crank command based upon battery current (208). One exemplary process to estimate the second engine crank command based upon battery current is detailed with reference to FIGS. 3 and 4. Upon detecting the second engine crank command, the battery controller 35 commands the second buffer 36 to periodically collect electric power states, e.g., current i and voltage v, e.g., at a rate of one datapoint each 10 milliseconds (210). The contents of the second buffer 36 in the form of current i and voltage v, are communicated on the first communication bus 50, and indicated as a two-dimensional array, as follows.

$$\begin{bmatrix} i_1 & v_1 \\ i_2 & v_2 \\ i_3 & v_3 \\ \vdots & \vdots \\ i_{max} & v_{min} \\ \vdots & \vdots \\ i_{p-1} & v_{p-1} \\ i_p & v_p \\ \vdots & \vdots \\ i_n & v_n \end{bmatrix}$$

The two-dimensional array may have a quantity of n values, wherein $i_1$, $v_1$ indicate first current and voltage states captured in the second buffer 36, and are associated with the second crank command. A maximum current $i_{max}$ and corresponding minimum voltage $v_{min}$ may be identified, and indicate a minimum current state and associated maximum voltage state in the second buffer 36 that may be employed in determining a starter resistance. The current $i_{p-1}$ and voltage $v_{p-1}$ indicate current states and voltages in the second buffer 36 that correspond to the engine speed state $\omega_{p-1}$, the term $\omega_p$ indicates a first engine speed state in the first buffer 16 having a non-zero value, and current $i_n$ and voltage $v_n$ indicate final current and voltage states in the second buffer 36.

The routine 200 synchronizes the contents of the first buffer 16 with the contents of the second buffer 36 by synchronizing the first engine crank command with the second, estimated crank command (212). The routine 200 also calculates a starter resistance based upon the electric power states in the second buffer 36, preferably employing the maximum current $i_{max}$ and corresponding voltage $v_{min}$ along with any accompanying time stamp (214).

The telematics device 40 communicates the engine speed states in the first buffer 16, the synchronized electric power states in the second buffer 36 and the calculated starter resistance to an off-vehicle system 60 (216). The off-vehicle system 60 evaluates the starter 20 based upon the engine speed states in the first buffer 16 synchronized with the electric power states in the second buffer 36 and the starter resistance (218) and determines a state of health of the starter 20 based thereon (220). By way of example, the state of health of the starter 20 may be deemed acceptable so long as the starter resistance is greater than a minimum threshold resistance associated with a system short-circuit and less than a maximum resistance threshold associated with a system open-circuit condition. The resultant state of health may be communicated to the vehicle operator via the telematics system 40.

Figure 3:
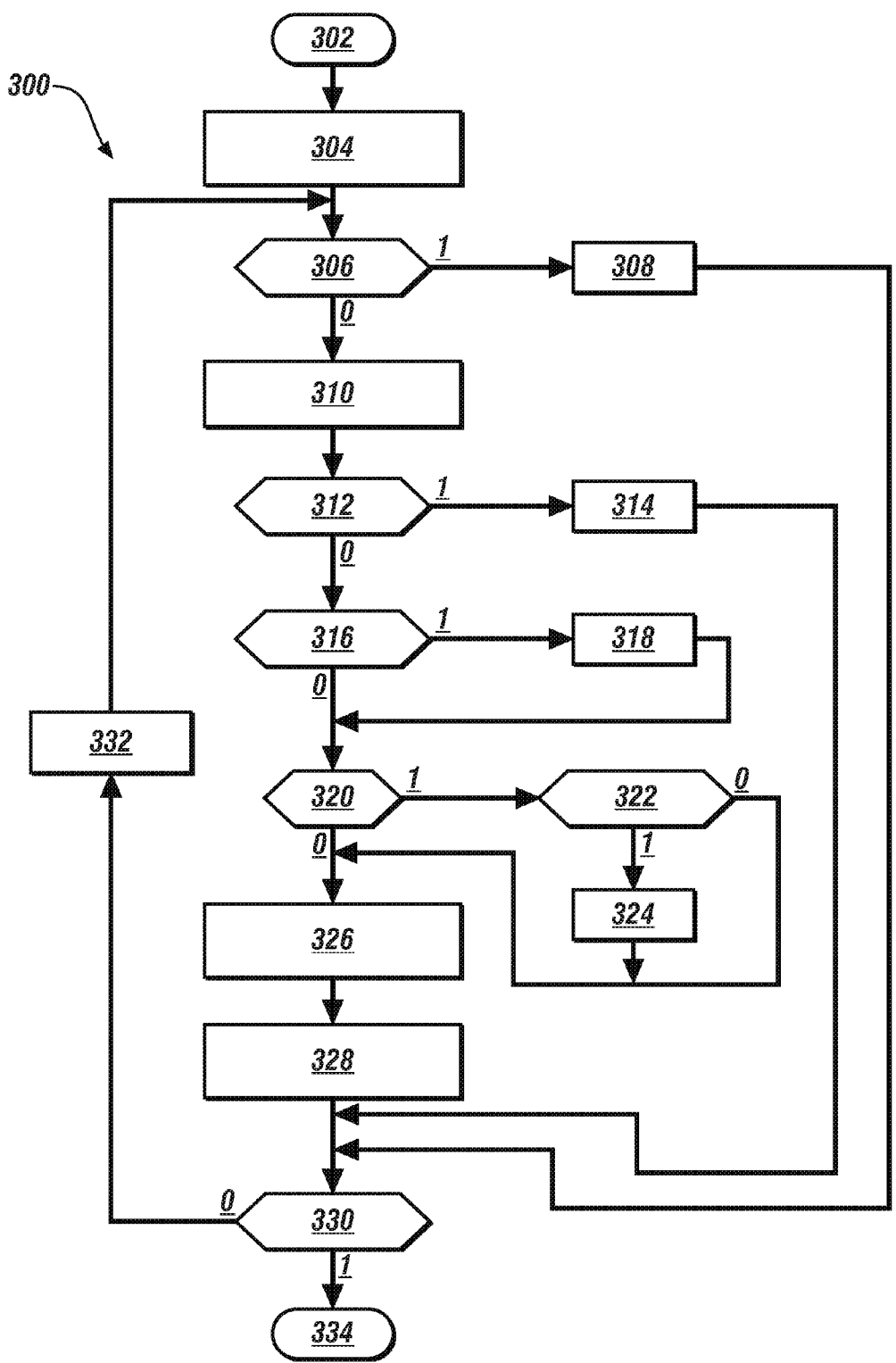
FIG. 3 schematically shows a crank command estimation routine for estimating occurrence of an engine crank command based upon battery current, in accordance with the disclosure.

FIG. 3 schematically shows a crank command estimation routine 300 for estimating occurrence of an engine crank command based upon battery current, including evaluating contents of the second buffer 36 to estimate the second crank command based upon monitored battery current i. The purpose in estimating the crank command is driven by communication latencies in the vehicle 100, including those occurring between the first and second communication buses 50, 55. As indicated with reference to FIG. 1, the body controller 25 has a point-to-point communication via control line 27 with the starter switch 22 and the engine controller 15. Furthermore, both the engine controller 15 and the body controller 25 communicate via the second communication bus 55, and the battery controller 35 communicates via the first communication bus 50. The crank command may be communicated to the battery controller 35 only after delays that are associated with bus communication and inter-bus communication. Thus, data collection of current $i_n$ and voltage $v_n$ states in the second buffer 36 in relation to the crank command may be indeterminate when relying upon determining the crank command based upon a signal communicated over the first and second communication buses 50, 55, which lessens the usefulness of the collected data for evaluating health of the starter 20.

Table 2 is provided as a key wherein the numerically labeled blocks and the corresponding functions are set forth as follows, corresponding to the crank command estimation routine 300.

TABLE 2

| BLOCK | BLOCK CONTENTS |
|---|---|
| 302 | Monitor electric current from the battery, $i_b$ and store in second buffer 36 |
| 304 | Initialize counters JJ = 0, L = 0 Flag = 0; T = 1 |
| 306 | Is T < Tth? |
| 308 | $\Delta i(T) = 0$ |
| 310 | $\Delta i(T) = i_b(T) - i_b(T\text{-Tth})$ |
| 312 | Is $\Delta i(T) >= 0$? |
| 314 | $\Delta i(T) = 0$ |
| 316 | Is $\Delta i(T) =/>$ Dmax and Is Flag = 0? |
| 318 | JJ = L |
| 320 | Is Flag = 0? |
| 322 | Is $\Delta i(T) </=$ Dmax? |
| 324 | Point = JJ Flag = 1 |
| 326 | For ss = 1: Point-1 Estimated Crank(ss) = 0 |
| 328 | For zz = Point; n Estimated Crank(zz) = 1 |
| 330 | Is T = n? |
| 332 | T = T + 1 L = L + 1 |
| 334 | End |

The crank command estimation routine 300 monitors electric current draw from the battery 30, and estimates occurrence of the crank command when the electric current from the battery 30 is greater than a threshold value. This may be accomplished as follows. The second buffer 36 periodically fills with sets of data including electric current from the battery, $i_b$, and each set of data includes a quantity of n data points, which are evaluated to determine whether a crank signal can be estimated (302). Evaluating each set of data preferably includes initializing counters (JJ=0; L=0; T=1) and resetting a flag (Flag=0) (304). A time step Tth is defined, and may have a numerical value of 1, 2 or another suitable value that inserts time space between the presently evaluated current value and a previous current value. When the counter T is less than the time step Tth (306)(1), a delta current state $\Delta i(T)$ is set equal to zero (308). The counter T is compared with the size of the buffer n (330), and if less than n (330)(0) and the time step T and counter L are incremented (332) and another iteration of the routine is executed.

Otherwise (306)(0), the delta current state $\Delta i(T)$ is calculated as a difference between the present current state $i_b(T)$ and a current state from a preceding time state determined by the time step Tth, referred to as $i_b(T-Tth)$ (310).

The delta current state $\Delta i(T)$ is evaluated, and if equal to or greater than zero (312)(0), the delta current state $\Delta i(T)$ is set equal to zero (314), and steps (330) and (332) are again executed.

When the delta current state $\Delta i(T)$ is less than zero (312)(1), the delta current state $\Delta i(T)$ is evaluated to determine if it is equal to or greater than a threshold current Dmax with the flag reset, i.e., equal to 0 (316). If so (316)(1), Counter JJ is set equal to counter L (318). If not (316)(0), the flag is evaluated to determine if it has been reset (320). If so (320)(0), the delta current state $\Delta i(T)$ is evaluated to determine if it is less than the threshold current Dmax (322), and if so (322)(1), a pointer is set equal to counter JJ, and the flag is set (=1) (324).

The crank command signal Crank(ss) is estimated to be inactive, i.e., equal to zero, for this iteration when the delta current state $\Delta i(T)$ is negative and of a magnitude that is less than the threshold current Dmax (326).

The crank command signal Crank(ss) is estimated to be active, i.e., equal to one, for this iteration when the delta current state $\Delta i(T)$ is negative and of a magnitude that is greater than the threshold current Dmax (328).

The counter T is compared with the size of the buffer n (330), and if less than n (330)(0) and the time step T and counter L are incremented (332) and another iteration of the routine is executed. Otherwise (330)(1), this iteration ends (334).

Figure 4:
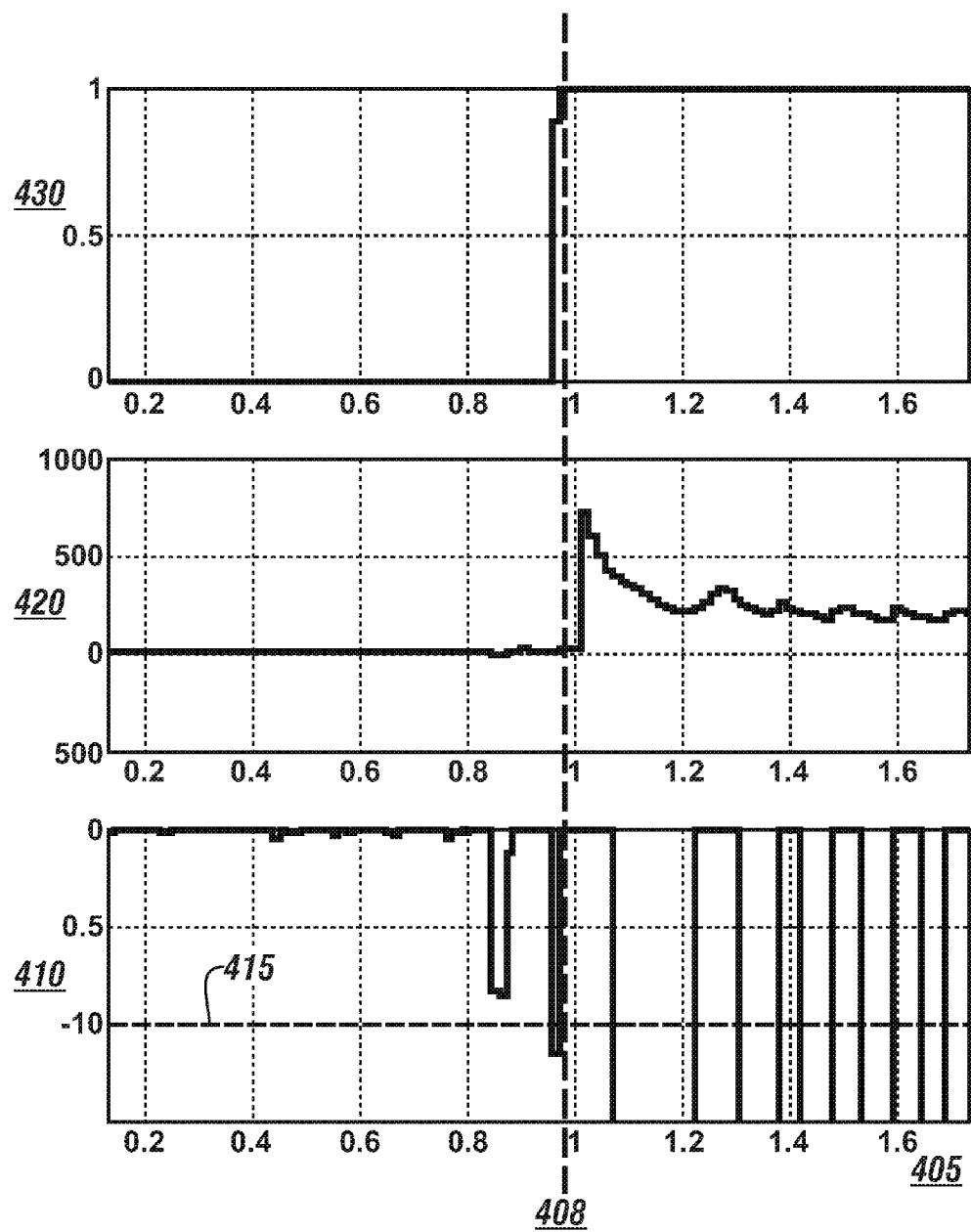
FIG. 4 graphically shows data associated with execution of the crank command estimation routine described with reference to FIG. 3, including battery current, a delta current state, and a crank command signal plotted in relation to time, in accordance with the disclosure.

FIG. 4 graphically shows data associated with execution of the crank command estimation routine 300 on an embodiment of the vehicle 100 described with reference to FIG. 1 that is employing the remote starter monitoring routine 200 described with reference to FIG. 2. The data shown with reference to FIG. 4 includes the absolute value of battery current i 420, a delta current state $\Delta i(T)$ 410 and a crank command signal 430, all plotted in relation to time 405, shown on the horizontal axis. The delta current state also includes a threshold delta current state $\Delta i(T)$ 415. As shown, the crank command signal 430 is at 0, and transitions to 1 at timepoint 408 when the delta current state $\Delta i(T)$ 410 surpasses the threshold delta current state $\Delta i(T)$ 415, which is immediately prior to the battery current i 420 achieving a maximum value that is associated with engine cranking.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention caimed is:

1. A system for a vehicle platform, comprising:
   an internal combustion engine including a starting system including a starter motor electrically connectable to a battery;
   an engine controller operatively connected to the internal combustion engine and including a first data buffer;
   a body controller operatively connected to the starting system;
   a battery controller in communication with the battery and including a second data buffer;
   a telematics system;
   first and second communication buses;
   wherein the engine controller, the body controller, and the telematics system communicate using the first communication bus, wherein the engine controller and the body controller employ a direct point-to-point communication link, wherein the battery controller communicates using the second communication bus, and wherein the first and second communication buses communicate therebetween;
   the body controller including a processor and an instruction set executable to initiate a first engine crank command, activate the starting system to crank the internal combustion engine and communicate the first engine crank command to the engine controller via the direct point-to-point communication link;
   the engine controller including a processor and an instruction set executable to monitor and store engine speed states in the first data buffer in response to the first crank command;
   the battery controller including a processor and an instruction set executable to monitor electric power states from the battery, determine a second engine crank command based upon the monitored electric power states from the battery and collect the electrical power states from the battery in the second data buffer;
   the body controller including a processor and an instruction set executable to synchronize the engine speed states collected in the first buffer and the electrical power states from the battery collected in the second buffer based upon the first engine crank command and the second engine crank command;
   the body controller including a processor and an instruction set executable to determine a starter resistance based upon the electrical power states from the battery collected in the second buffer; and
   the telematics device including a processor and an instruction set executable to communicate the starter resistance and the monitored engine speed states synchronized with the monitored electrical power states to a remote system.

\* \* \* \* \*